(12) United States Patent  
Chang et al.

(10) Patent No.: US 9,066,175 B2  
(45) Date of Patent: Jun. 23, 2015

(54) PORTABLE DEVICE

(71) Applicant: Quanta Computer Inc., Taoyuan Shien (TW)

(72) Inventors: Chun-Sen Chang, New Taipei (TW); Tai-Jung Sung, Taoyuan Shien (TW); Jung-Wen Chang, Taoyuan County (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 141 days.

(21) Appl. No.: 13/867,520

(22) Filed: Apr. 22, 2013

(65) Prior Publication Data

US 2014/0192469 A1  Jul. 10, 2014

Related U.S. Application Data

(60) Provisional application No. 61/749,932, filed on Jan. 8, 2013.

(51) Int. Cl.
*G06F 1/16* (2006.01)
*H04R 1/02* (2006.01)

(52) U.S. Cl.
CPC .......... *H04R 1/028* (2013.01); *H04R 2205/021* (2013.01); *G06F 1/1624* (2013.01); *G06F 1/1658* (2013.01); *G06F 1/1688* (2013.01)

(58) Field of Classification Search
CPC ................................. G06F 1/16; H04R 1/028
USPC ........................................ 361/679.08–679.23
See application file for complete search history.

(56) References Cited

U.S. PATENT DOCUMENTS

| 6,304,435 | B1 * | 10/2001 | Hsu | 361/679.23 |
| 6,697,495 | B1 * | 2/2004 | Youn | 381/333 |
| 7,061,751 | B2 * | 6/2006 | Hamada et al. | 361/679.23 |
| 7,277,275 | B2 * | 10/2007 | Won et al. | 361/679.27 |
| 2001/0021098 | A1 * | 9/2001 | Kambayashi | 361/680 |

* cited by examiner

*Primary Examiner* — Tuan T Dinh
*Assistant Examiner* — Rockshana Chowdhury
(74) *Attorney, Agent, or Firm* — Rabin & Berdo, P.C.

(57) ABSTRACT

A portable device includes a display module and a keyboard module. The display module includes a display casing, at least one speaker and at least one sound output opening. The speaker is accommodated in the display casing for outputting sounds. The sound output opening is used for transmitting the sounds from the speaker. The keyboard module includes a keyboard casing and a plurality of keys. The keyboard casing includes a sound guide chamber therein and at least one sound input opening for receiving the sounds from the sound output opening. The sound input opening is spatially communicated with the sound guide chamber. The keys are disposed on the keyboard casing. Two adjacent keys define a gap therebetween, and this gap is spatially communicated with the sound guide chamber.

8 Claims, 7 Drawing Sheets

PORTABLE DEVICE

RELATED APPLICATIONS

This application claims priority to U.S. Provisional Application Ser. No. 61/749,932, filed Jan. 8, 2013, which is herein incorporated by reference.

BACKGROUND

1. Technical Field

Embodiments of the present invention relate to a portable device. More particularly, embodiments of the present invention relate to a portable device and a speaker thereof.

2. Description of Related Art

A typical and currently available portable device, such as a notebook, a tablet PC (personal computer), or a convertible PC that can be transformed between a notebook configuration and a tablet PC configuration, usually includes a speaker module for playing audio files.

In such a typical portable device, the speaker module utilizes speaker holes formed in the casing of the portable device to allow sounds from a speaker(s) of the speaker module that is disposed in the casing to be transmitted external to the portable device. However, because the speaker holes are exposed on the casing, the sounds tend to diverge and fail to concentrate, such that the volume of the sounds is lowered. Further, exposing the speaker holes on the surface of the casing in this manner requires the use of a certain amount of space of the casing, so that the casing cannot be reduced in size. Additionally, in the case of the convertible PC, a keyboard module thereof may block the transmission of the sounds from the speaker holes, further reducing the volume of the sounds and negatively affecting sound quality.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with one embodiment of the present invention, a portable device includes a display module and a keyboard module. The display module includes a display casing, at least one speaker and at least one sound output opening. The speaker is accommodated in the display casing and outputs sounds in response to receiving audio signals. The sound output opening is used for transmitting the sounds from the speaker. The keyboard module includes a keyboard casing and a plurality of keys. The keyboard casing includes a sound guide chamber therein and at least one sound input opening for receiving the sounds from the sound output opening. The sound input opening is spatially communicated with the sound guide chamber. The keys are disposed on the keyboard casing. Two of the keys adjacent to each other define a gap therebetween, and this gap is spatially communicated with the sound guide chamber.

It is to be understood that both the foregoing general description and the following detailed description are by examples, and are intended to provide further explanation of the invention as claimed.

BRIEF DESCRIPTION OF THE DRAWINGS

Embodiments of the invention can be more fully understood by reading the following detailed description, with reference made to the accompanying drawings as follows.

DETAILED DESCRIPTION

Figure 1:
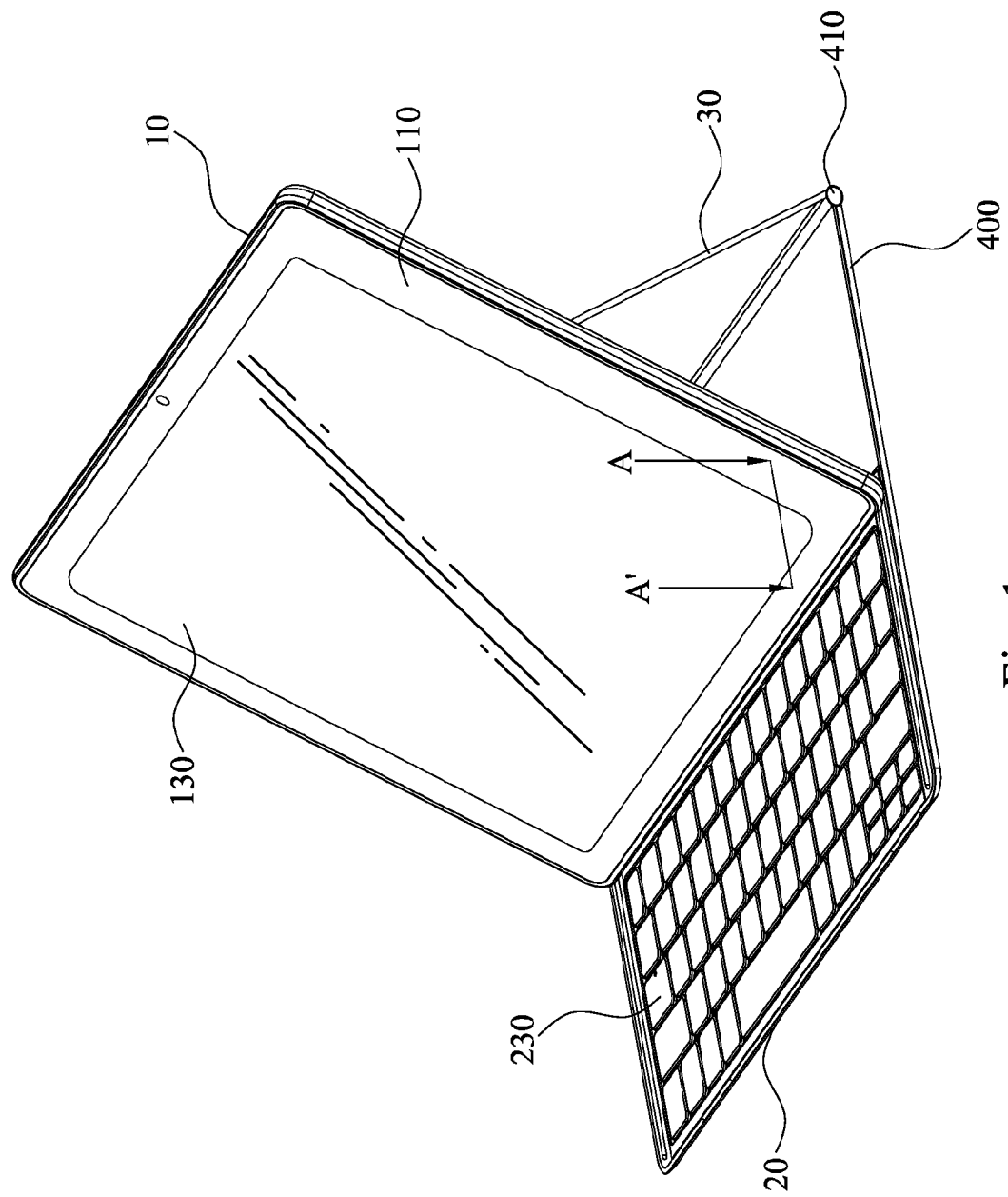
FIG. 1 is a perspective view of a portable device in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a perspective view of a portable device in accordance with one embodiment of the present invention. As shown in FIG. 1, the portable device includes a display module 10, a keyboard module 20 and at least one arm 30. The display module 10 is disposed on the keyboard module 20 and supported by the arm 30. The arm 30 is rotatable such that the display module 10 can be convertible between a standing state and a lying state.

It is to be understood that "standing state" of the display module 10 as used in this specification refers to a configuration in which the display module 10 is standing on the keyboard module 20. Stated differently, in some embodiments, when the display module 10 is in the standing state, a display panel 130 of the display module 10 and keys 230 of the keyboard module 20 are both exposed.

Moreover, it is to be understood that "lying state" of the display module 10 as used in this specification refers to a configuration in which the display module 10 is lying on the keyboard module 20. Stated differently, in some embodiments, when the display module 10 is in the lying state, the keys 230 of the keyboard module 20 are covered by the display module 10, while the display panel 130 of the display module 10 is exposed.

Figure 2:
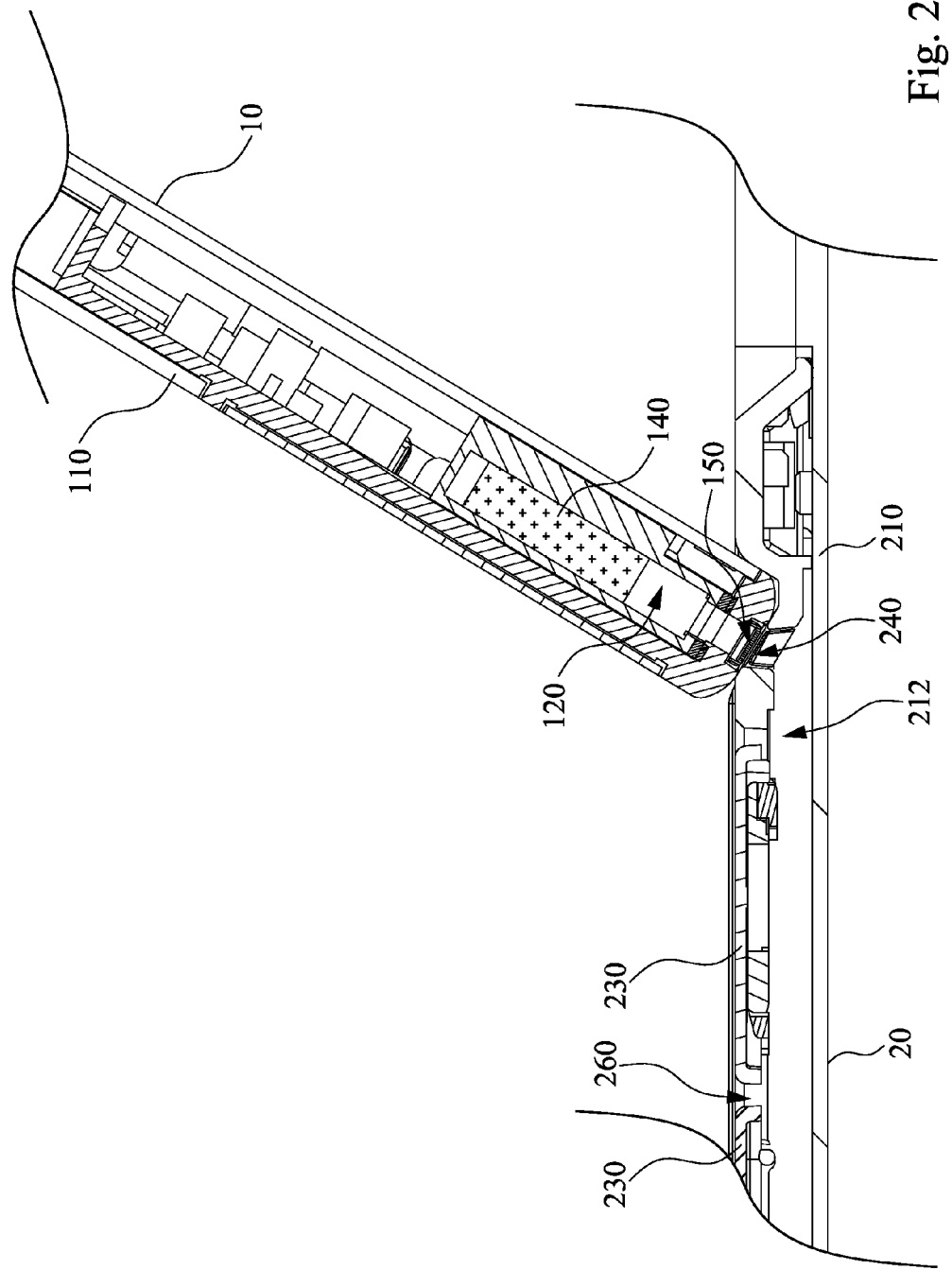
FIG. 2 is a fragmentary cross-sectional view of the portable device taken along line A-A' in FIG. 1.

FIG. 2 is a fragmentary cross-sectional view of the portable device taken along line A-A' in FIG. 1. As shown in FIG. 2, the display module 10 includes a display casing 110 and at least one speaker 140. The speaker 140 is accommodated in the display casing 110, and outputs sounds in response to receiving audio signals. The keyboard module 20 includes a keyboard casing 210 and keys 230. The keyboard casing 210 includes a sound guide chamber 212 therein and at least one sound input opening 240. The sound input opening 240 is used for receiving the sounds from the speaker 140. The sound input opening 240 is spatially communicated with the sound guide chamber 212, so that the sounds from the speaker 140 can be transmitted into the sound guide chamber 212 via the sound input opening 240. The keys 230 are disposed on the keyboard casing 210. Two of the keys 230 that are adjacent to each other define a gap 260 therebetween. The gap 260 is spatially communicated with the sound guide chamber 212. Hence, through this configuration, the sound input opening 240 and the gap 260 are spatially communicated through the sound guide chamber 212. When the display module 10 is in the standing state, while the sound input opening 240 is covered by the display casing 110, the gap 260 is not covered, so that the sounds from the speaker 140 can be transmitted into the sound guide chamber 212 through the sound input opening 240, and then transmitted out of the keyboard casing 210 through the gap 260 defined between two of the keys 230, as described above.

In this embodiment, the portable device can utilize the gap 260 between keys 230 to transmit the sounds from the speaker 140 external to the portable device, and therefore, no exposed speaker hole is required when the display module 10 is in the standing state. As a result, the portable device can be reduced in size.

In some embodiments, the display casing 110 includes at least one sound output opening 150 for transmitting the sounds from the speaker 140 to the keyboard module 20. More particularly, in some embodiments, the display casing 110 includes a speaker chamber 120 therein. The speaker 140 is accommodated in the speaker chamber 120. The sound output opening 150 is spatially communicated with the speaker chamber 120. In other words, the speaker chamber 120 is not sealed, and instead, it is partially exposed by the sound output opening 150. Therefore, when the speaker 140 generates sounds, the sounds can travel through the speaker chamber 120 and out the sound output opening 150 to be guided toward the keyboard module 20.

In some embodiments, the sound output opening 150 can be substantially aligned with the sound input opening 240 when the display module 10 is in the standing state. In other words, the sound output opening 150 on the display casing 110 and the sound input opening 240 on the keyboard casing 210 are overlapped when the display module 10 is in the standing state, so that the sounds from the speaker 140 can be effectively transmitted into the sound guide chamber 212 in the keyboard casing 210 through the sound output opening 150 and the sound input opening 240.

It is to be understood that the term "substantially" in this specification refers to the fact that embodiments including any small variation or modification not affecting the essence of the technical features can be included in the scope of the present invention. For example, the feature in which "the sound output opening 150 can be substantially aligned with the sound input opening 240" described above not only includes embodiments where the sound output opening 150 is exactly aligned with the sound input opening 240, but also includes embodiments where the sound output opening 150 is slightly deviated from the sound input opening 240. In other words, in some embodiments, the sound output opening 150 can be only partially overlapped with the sound input opening 240.

In some embodiments, the shape and the location of the sound input opening 240 correspond to the shape and the location of the sound output opening 150. In other words, the sound input opening 240 and the sound output opening 150 can be formed in the same shape and disposed at locations such that the sound input opening 240 and the sound output opening 150 are alignable with each other, such as when the display module 10 is in the standing state. In some embodiments, the area of the sound output opening 150 and the area of the sound input opening 240 can be equal. In some embodiments, the area of the sound output opening 150 and the area of the sound input opening 240 can be different.

Figure 3:
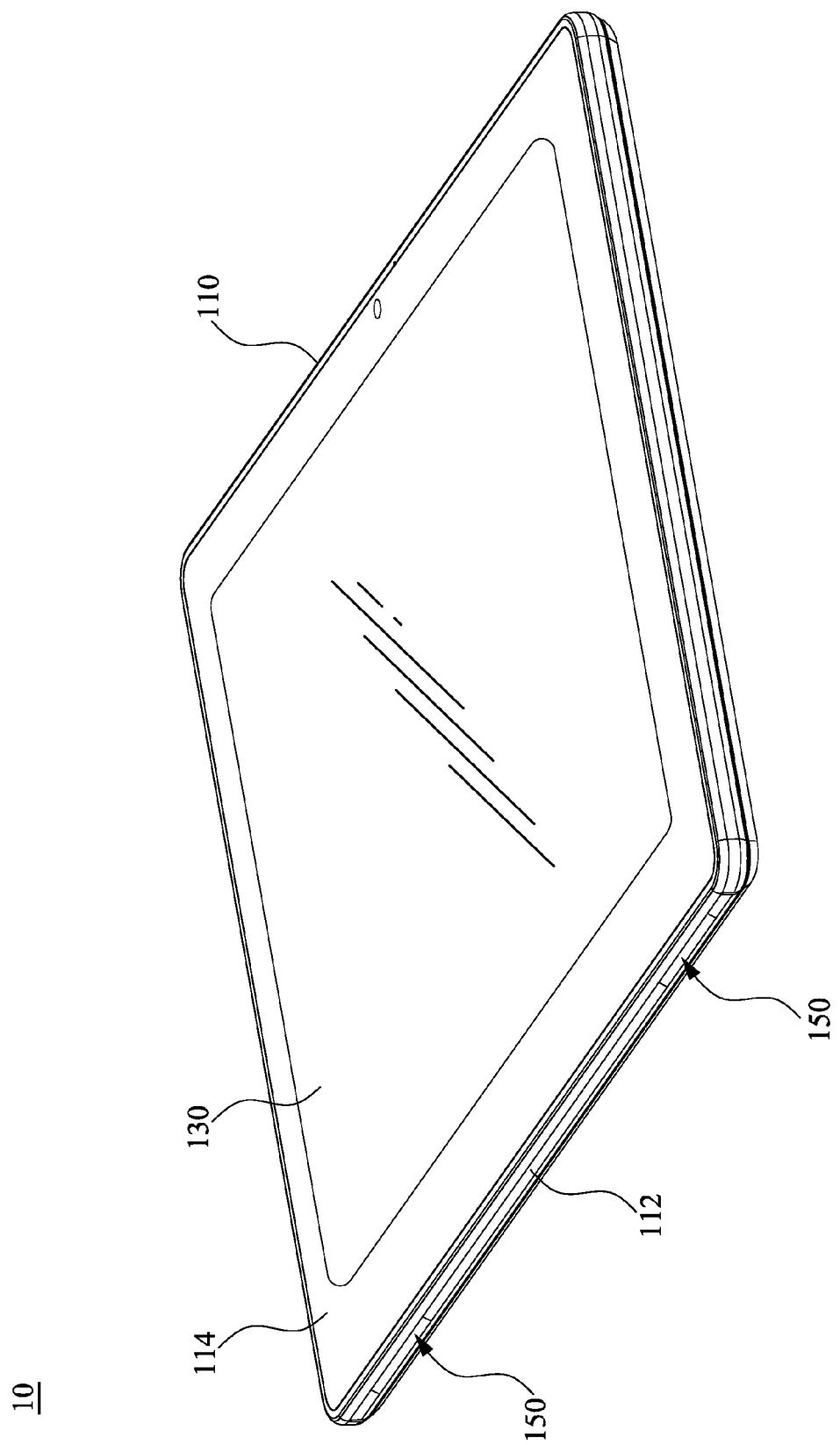
FIG. 3 is a perspective view of a display module in FIG. 1.

FIG. 3 is a perspective view of the display module 10 in FIG. 1. As shown in FIG. 3, the display casing 110 includes a first surface 112 and a is second surface 114. The second surface 114 is adjacent to the first surface 112. More particularly, in some embodiments, the second surface 114 is substantially perpendicular to the first surface 112, and they are connected with each other. The sound output opening 150 is disposed on the first surface 112. The display panel 130 is disposed on the second surface 114. In other words, the sound output opening 150 and the display panel 130 are disposed on different surfaces, in particular, on two adjacent and substantially orthogonal surfaces.

In some embodiments, the number of the sound output opening 150 can be plural, and these sound output openings 150 can be arranged substantially along the lengthwise direction of the first surface 112. It is understood that the term "lengthwise direction" refers to the direction parallel to the longest side of a surface or an object.

Figure 4:
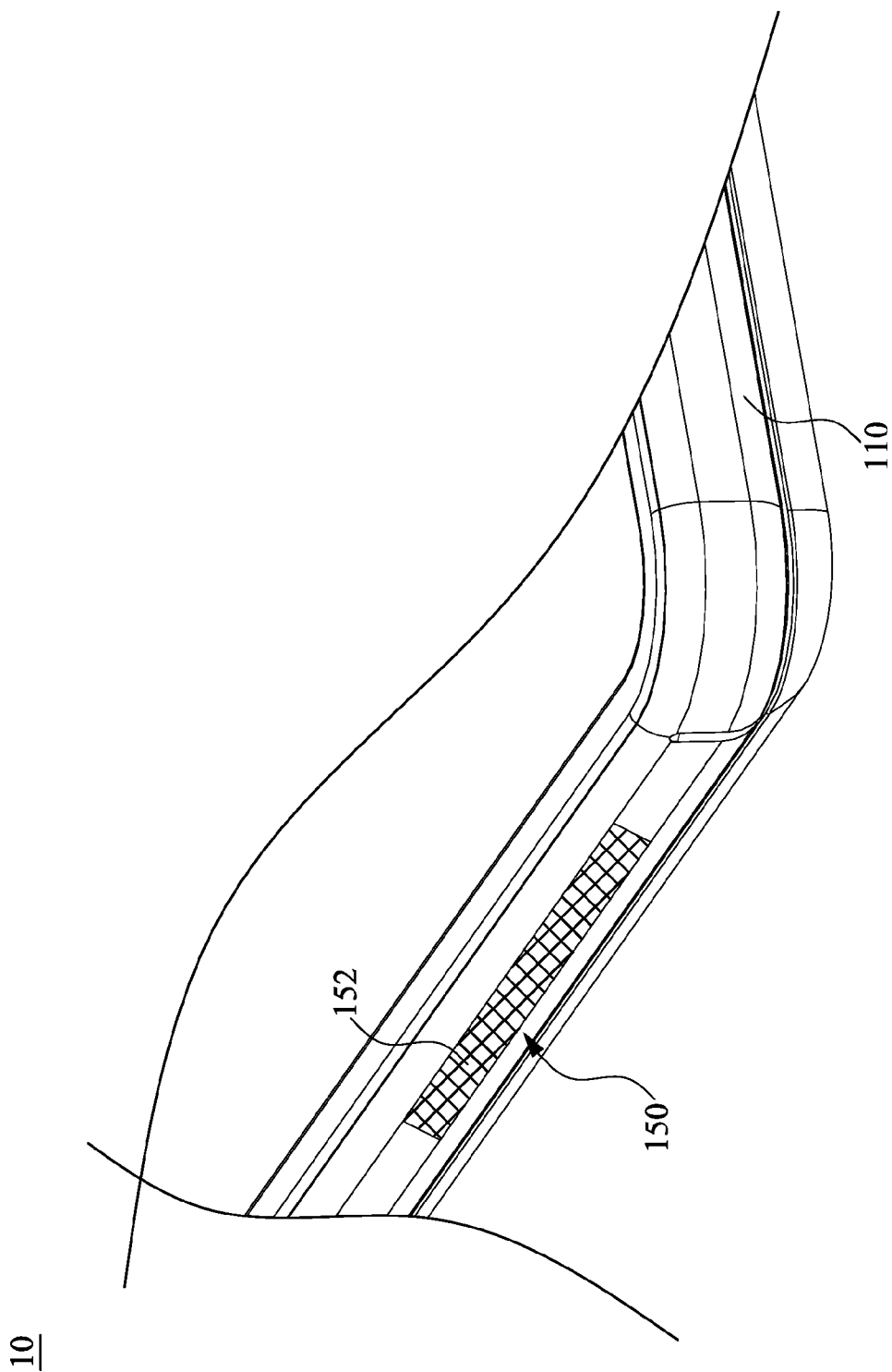
FIG. 4 is a fragmentary perspective view of the display module in FIG. 3.

FIG. 4 is a fragmentary perspective view of the display module 10 in FIG. 3. As shown in FIG. 4, in some embodiments, the display module 10 includes a speaker mesh 152. The speaker mesh 152 is disposed on the sound output opening 150. More particularly, in some embodiments, the speaker mesh 152 covers the sound output opening 150.

Figure 5:
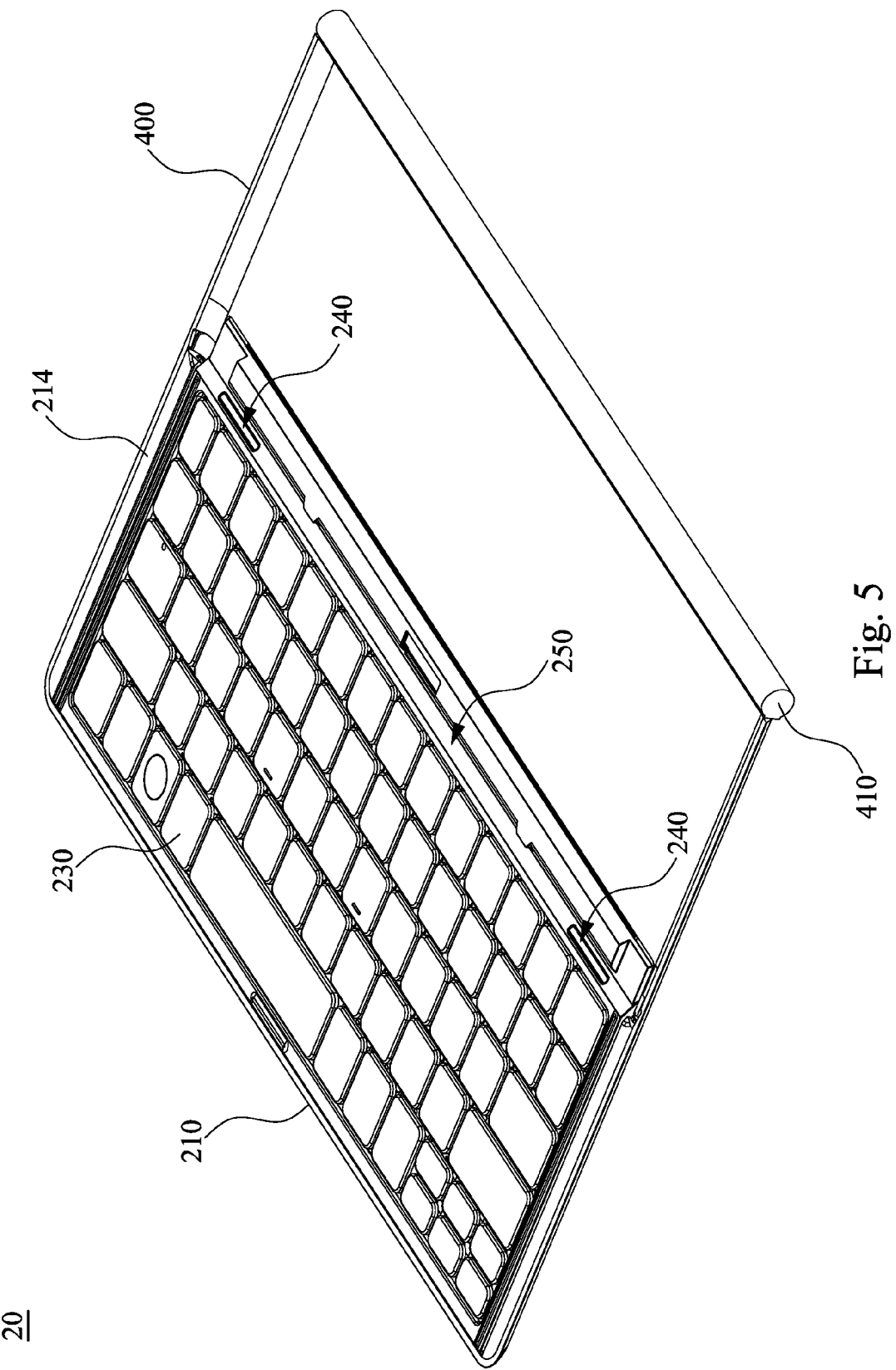
FIG. 5 is a perspective view of a keyboard module in FIG. 1.

FIG. 5 is a perspective view of the keyboard module 20 in FIG. 1. As shown in FIG. 5, the keyboard casing 210 includes a top surface 214. The to keys 230 and the sound input opening 240 are all disposed on the top surface 214. In other words, the keys 230 and the sound input opening 240 are all positioned on the same surface.

In some embodiments, the keyboard casing 210 includes a groove 250 for holding the display casing 110 (See FIG. 3), so that the display casing 110 is can steadily stand on the keyboard casing 210. More particularly, in some embodiments, the display casing 110 can be inserted into the groove 250 when the display module 10 is in the standing state (See FIG. 1), such that the surface in the groove 250 presses against the display casing 110 and the display casing 110 can be steadily held in place.

In some embodiments, the sound input opening 240 is positioned in the groove 250. When the display casing 110 (See FIG. 3) is inserted into the groove 250, the first surface 112 of the display casing 110 is in contact with the surface in the groove 250, and the sound output opening 150 (See FIG. 3) can be aligned with the sound input opening 240.

In some embodiments, the number of the sound input opening 240 can be plural, and these sound input openings 240 can be arranged substantially along the lengthwise direction of the groove 250.

In some embodiments, the number of the sound input openings 240 and the number of the sound output openings 150 (See FIG. 3) can be equal. In this case, the distance between two of the sound input openings 240 adjacent to each other and the distance between two of the sound output openings 150 adjacent to each other can also be equal. Therefore, each of the sound output openings 150 can be aligned with one of the sound input openings 240.

In some embodiments, the portable device includes a frame 400 encompassing the keyboard casing 210. The frame 400 includes a shaft 410. The shaft 410 is positioned away from the keyboard casing 210. In other words, the shaft 410 and the keyboard casing 210 are spaced apart from each other. As shown in FIG. 1, the arm 30 is pivotally connected between the display casing 110 and the shaft 410 of the frame 400, so that when the arm 30 rotates, the display module 10 can be converted to stand or lie on the keyboard module 20.

Figure 6:
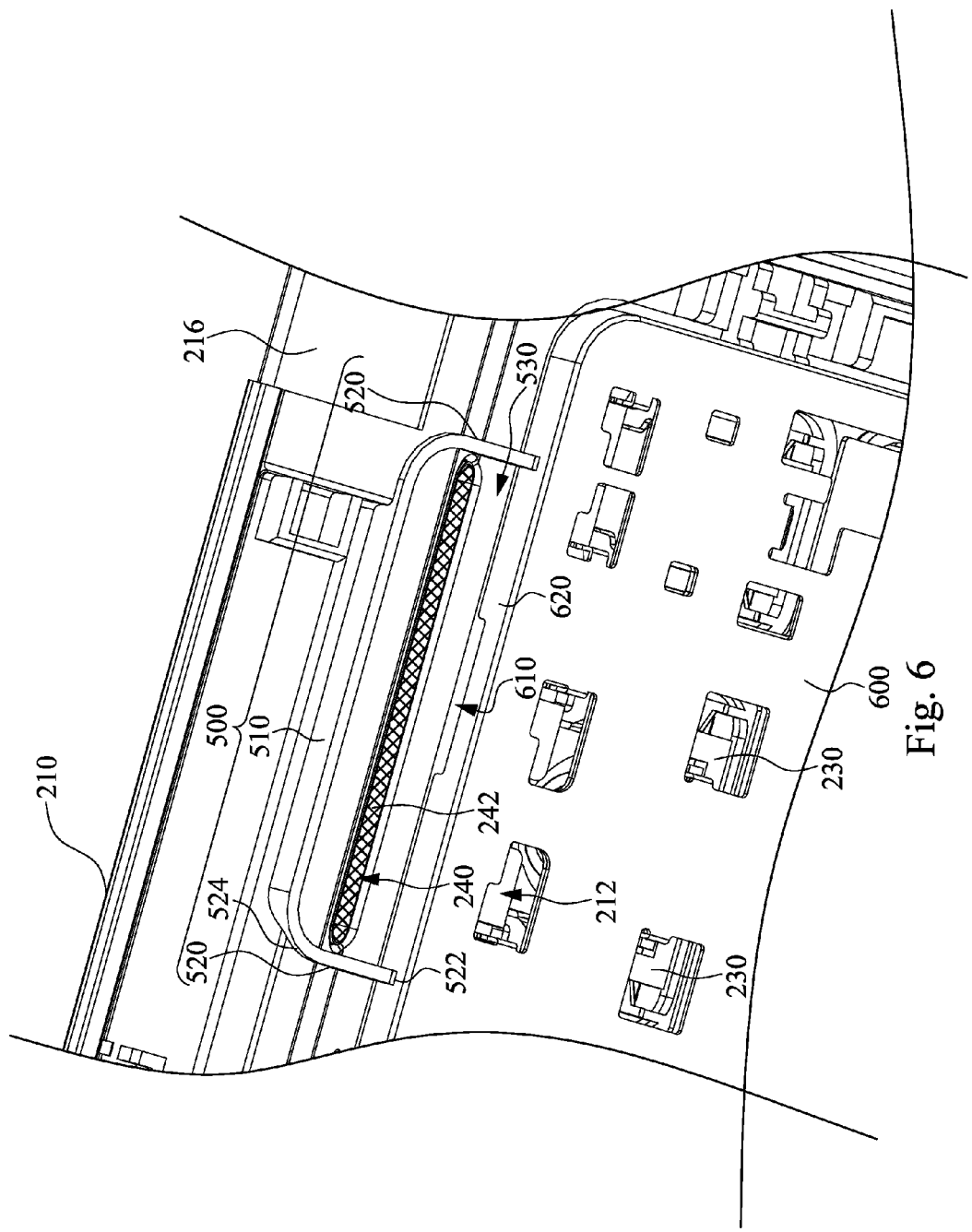
FIG. 6 is a fragmentary rear perspective view of the interior of the keyboard module in accordance with one embodiment of the present invention.

FIG. 6 is a fragmentary rear perspective view of the interior of the keyboard module 20 in accordance with one embodiment of the present invention. As shown in FIG. 6, in some embodiments, the keyboard module 20 includes at least one rib 500. The rib 500 partially surrounds the sound input opening 240. More particularly, the rib 500 includes a plurality of lateral walls 520 and at least one back wall 510. Each of the lateral walls 520 includes a proximal end 522 and a distal end 524. The proximal end 522 is proximal to the keys 230, and the distal end 524 is distal to the keys 230. The back wall 510 connects the distal ends 524 of the lateral walls 520, and the proximal ends 522 of the lateral walls 520 are spaced apart from each other. In other words, the back wall 510 and the lateral walls 520 cooperate to form a substantially C-shaped structure and to define a sound concentrate recess 530. Because the back wall 510 is distal to the keys 230, the sound concentrate recess 530 can guide the sounds transmitted through the sound input opening 240 toward the keys 230, so that the sounds can be concentrated. As a result, the volume of the sounds produced by the speaker 140 of the portable device can be increased.

In some embodiments, the keyboard module 20 includes a rack 600. The rack 600 supports the keys 230. The rack 600 includes at least one cavity 610 positioned between the lateral walls 520 of the rib 500. The cavity 610 is spatially communicated with the sound guide chamber 212. More particularly, in some embodiments, the rack 600 includes a lateral plate 620. Part of the lateral plate 620 is removed or indented to form the cavity 610. Because the cavity 610 is positioned between the lateral walls 520, it can be spatially communicated with the sound concentrate recess 530. Therefore, the sounds transmitted from the sound input opening 240 can be effectively transmitted through the cavity 610 and into the sound guide chamber 212.

In some embodiments, the keyboard casing 210 includes an inner surface 216 opposite to the display casing 110 (See FIG. 1). In other words, the inner surface 216 and the top surface 214 (See FIG. 5) of the keyboard casing 210 are opposite, or stated in yet another manner, the inner surface 216 is inside the keyboard casing 210, and the top surface 214 is outside the keyboard casing 210. The rib 500 is protruded on the inner surface 216 of the keyboard casing 210. Therefore, the rib 500 is concealed in the keyboard casing 210, and can concentrate the sounds transmitted into the keyboard casing 210.

In some embodiments, the keyboard module 20 includes a speaker mesh 242. The speaker mesh 242 is disposed on the sound input opening 240. More particularly, in some embodiments, the speaker mesh 242 covers the sound input opening 240.

Figure 7:
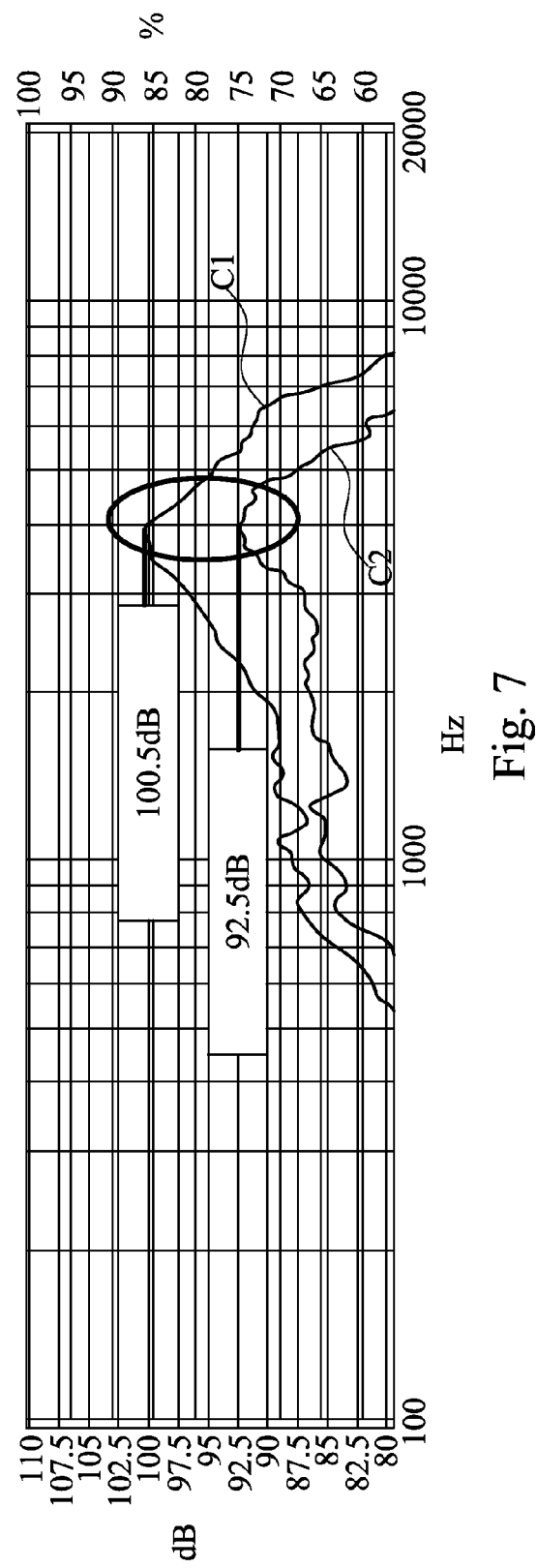
FIG. 7 is a decibel chart of the portable device in accordance with one embodiment of the present invention.

FIG. 7 is a decibel chart of the portable device in accordance with one embodiment of the present invention. When the portable device is in a standing state, the decibel curve C1 is realized. When the portable device is in a lying state, the decibel curve C2 is realized. As shown in FIG. 7, it is clear that the volume when the portable device is in a standing state is higher than the volume when the portable device is in a lying state. More particularly, in some embodiments, the peak of the decibel curve C1 is about 100.5 dB, and the peak of the decibel curve C1 is about 92.5 dB, in which the difference therebetween is about 8 dB.

It is understood that although the foregoing embodiments take a convertible PC as example, the invention is not limited to application to a convertible PC. The invention may be applied to any portable device without departing from the scope or spirit of the invention, as long as it includes a display module and a keyboard module, such as a notebook, a cellular phone and so on.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A portable device, comprising:
a display module, comprising:
   a display casing;
   at least one speaker accommodated in the display casing, the speaker outputting sounds in response to receiving audio signals; and
   at least one sound output opening for transmitting the sounds from the speaker; and
a keyboard module, comprising:
   a keyboard casing comprising a sound guide chamber therein, a groove, and at least one sound input opening for receiving the sounds from the sound output opening, wherein the sound input opening is spatially communicated with the sound guide chamber, wherein the sound input opening is positioned in the groove, wherein the groove is configured to hold the display casing, wherein the sound output opening is substantially aligned with the sound input opening when the display casing is held by the groove; and
   a plurality keys disposed on the keyboard casing, wherein two of the keys adjacent to each other define a gap therebetween, and the gap is spatially communicated with the sound guide chamber,
wherein the display casing comprises a speaker chamber therein, wherein the speaker is accommodated in the speaker chamber, and wherein the sound output opening is spatially communicated with the speaker chamber.

2. The portable device of claim 1, further comprising at least one rib partially surrounding the sound input opening.

3. The portable device of claim 2, wherein the rib comprises a plurality of lateral walls and at least one back wall, wherein each of the lateral walls comprise a proximal end proximal to the keys and a distal end distal to the keys, wherein the back wall connects the distal ends of the lateral walls, wherein the proximal ends of the lateral walls are spaced apart.

4. The portable device of claim 3, further comprising a rack supporting the keys, wherein the rack comprises at least one cavity positioned between the lateral walls of the rib.

5. The portable device of claim 4, wherein the cavity is spatially communicated with the sound guide chamber.

6. The portable device of claim 2, wherein the keyboard casing comprises an inner surface opposite to the display casing, wherein the rib is protruded on the inner surface.

7. The portable device of claim 1, wherein the display module comprises a display panel disposed on the display casing, wherein the display module is convertible between a standing state and a lying state, wherein when the display module is in the standing state, the display panel and the keys are all exposed, wherein when the display module is in the lying state, the keys are covered by the display module, and the display panel is exposed.

8. The portable device of claim 7, further comprising:
a frame encompassing the keyboard casing, wherein the frame comprises a shaft positioned spaced apart from the keyboard casing; and
at least one arm pivotally connected between the display casing and the shaft of the frame.

* * * * *